US007981470B1

(12) United States Patent
Butler

(10) Patent No.: US 7,981,470 B1
(45) Date of Patent: *Jul. 19, 2011

(54) INTERIOR CHEMICAL TREATMENTS FOR INFLATABLE BALLOONS

(76) Inventor: Sean W. Butler, Lafayette, IN (US)

( * ) Notice: Subject to any disclaimer, the term of this patent is extended or adjusted under 35 U.S.C. 154(b) by 633 days.

This patent is subject to a terminal disclaimer.

(21) Appl. No.: 11/866,123

(22) Filed: Oct. 2, 2007

(51) Int. Cl.
 *A63H 3/06* (2006.01)
 *B05D 1/02* (2006.01)
(52) U.S. Cl. ........ 427/237; 466/220; 427/230; 427/236; 427/248.1; 427/255.23
(58) Field of Classification Search .................. 427/230
 See application file for complete search history.

(56) References Cited

U.S. PATENT DOCUMENTS

| | | | | |
|---|---|---|---|---|
| 4,142,322 A | * | 3/1979 | Zeyra | 446/224 |
| 4,828,176 A | * | 5/1989 | Crowe | 239/60 |
| 5,577,947 A | * | 11/1996 | Malloy et al. | 446/220 |
| 5,964,636 A | * | 10/1999 | Carrera | 446/220 |
| 6,158,676 A | * | 12/2000 | Hughes | 239/405 |
| 6,232,389 B1 | * | 5/2001 | Feeney et al. | 524/450 |
| 7,686,668 B1 | * | 3/2010 | Butler | 446/220 |
| 2004/0136912 A1 | * | 7/2004 | Murray et al. | 424/10.4 |
| 2005/0197480 A1 | * | 9/2005 | Temple et al. | 528/83 |
| 2006/0005328 A1 | * | 1/2006 | Johnson | 12/128 R |

OTHER PUBLICATIONS

Bieleman, Additives for Coatings, Wiley-VCH, (2000).*
Lanzer, Mastering Endovascular Techniques: A Guide to Excellence, LW&W, (Sep. 1, 2006).*
Cimo, "Chapter 10: Balloon Techniques", WMO Guide to Meteorological Instruments and Methods of Observations, 7th Edition, (Aug. 6, 2008).*
Levin et al., "Two Rubber Balloons: Phase Diagram of Air Transfer", Physical Review E, vol. 69, (2004).*
Tickner, Report: A Review of the Availability of Plastic Substitutes for Soft PVC in Toys, (Feb. 1999).*

* cited by examiner

*Primary Examiner* — Michael Cleveland
*Assistant Examiner* — Lisha Jiang
(74) *Attorney, Agent, or Firm* — Fliesler Meyer LLP

(57) ABSTRACT

A commercial method for the interior chemical treatment of inflatable balloons, the method including inflating a balloon with air, coating the interior surface of a balloon with a micro-atomized chemical mixture and allowing the chemical mixture to coat and permeate the inner surface of the balloon.

16 Claims, 1 Drawing Sheet

INTERIOR CHEMICAL TREATMENTS FOR INFLATABLE BALLOONS

BACKGROUND

Toy balloons have typically been used at holiday events, conventions, festivals, music concerts, family gatherings such as birthdays, weddings, anniversaries, showers, and numerous holidays to enhance the festivity of the surrounding event. However, if a child safe inflatable colorful balloon was also able to give off a pleasant scent or smell; such as white balloons smelling like gardenia flowers for a wedding; green balloons having a blue spruce-pine scent for Christmas holiday gatherings; or red balloons that smell like cherry candy for children, this product would be dramatically unique. In fact, these safer fragrantly enhanced balloons would provide a tremendous variety of options for parents by allowing them to customize a fragrant setting for their own special occasion or to offer their children the choice to pick out their favorite fragrance of this new toy product.

Other methods currently exist to introduce a fragrance to a balloon. For example, a balloon fragranced by using a solid scented tablet and inserting it into a plug valve and attaching the outside valve to the balloon neck. In this method, however, the valve creates a choking hazard and the existence of saliva around the balloon neck upon inflation can drip onto the tablet causing it to dissolve and break up into pieces, creating a safety issue should the balloon burst. Another example of fragrancing a balloon is via the exterior by introducing a very thin liquid fragrance to the outside of the balloon. However, when using this method, the fragrance has the potential to rub off on the user's hands due to the exterior's slick, glossy finish and also creating possible irritation to the user's eyes. Moreover, the exterior scenting on the balloon quickly dissipates with wind or other elements and only remains on the balloon for a short period of time. Fragrant balloons with scented powder in the interior can provide similar safety hazards upon bursting, wherein a small cloud of powder is released which can easily irritate the eyes or have a temporary negative effect if inhaled. Nevertheless, what is needed is an improved method adding and enhancing both the method of fragrancing an inflatable balloon and adding safety chemicals to prevent young children from chewing, licking, sucking or choking on the inflatable balloons.

BRIEF DESCRIPTION OF THE DRAWINGS

The accompanying drawing, which is incorporated into and constitutes a part of this specification, illustrates one or more embodiments and together with the detailed description, serve to explain the principles and implementations of the invention. In the drawing.

DETAILED DESCRIPTION

Figure 1:
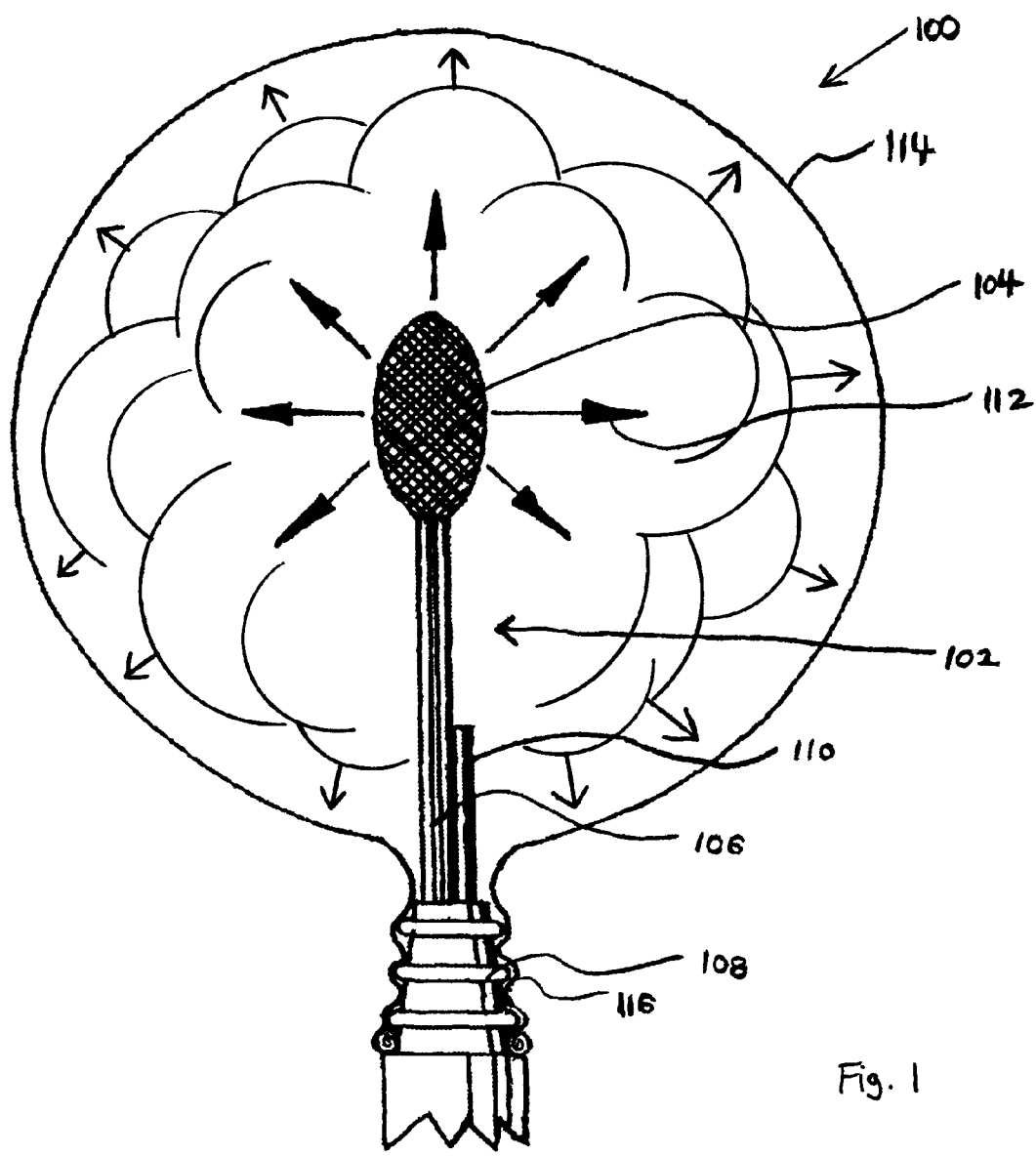
FIG. 1 illustrates an embodiment of a micro-atomization device for the interior chemical treatment of an inflatable balloon.

Embodiments are described herein in the context of methods related to the interior chemical treatment of inflatable balloons. Those of ordinary skill in the art will realize that the following detailed description is illustrative only and is not intended to be in any way limiting. Other embodiments of the present invention will readily suggest themselves to such skilled persons having the benefit of this disclosure. Reference will now be made in detail to implementations of embodiment of the present invention as illustrated in the accompanying drawing. The same reference indicators will be used throughout the drawing and the following detailed description to refer to the same or like parts.

Most toy balloons are typically made of natural, biodegradable rubber (also known as latex). In general, the permeable sponge-like character of latex allows chemical mixtures to be absorbed and/or permeate into the balloon. Given the fact that most inflatable balloons have an unfinished interior surface, whereas the exterior wall is finished (i.e., glossy, slick), chemical mixtures will naturally permeate into the balloon more easily if they are introduced to the interior of the balloon. The present invention takes advantage of the natural characteristics inherent to latex balloons to chemically treat inflatable balloons by introducing fragrances, safety additives and/or other additional additives into the interior of the balloon. More specifically, safety additives and/or other additional additives which have been micro-atomized are introduced to the interior of the inflatable balloon, the micro-atomized chemicals coating the inner surface of the inflatable balloon. The micro-atomized chemicals introduced to the interior of the inflatable balloon can include a vaporous "gas like" cloud having a large surface area. Moreover, the micro-atomized chemicals can include liquids which have been changed completely into a gas. The micro-atomized chemicals are absorbed into the porous matrix of the balloon, thereby trapping the micro-atomized chemicals within the latex. The amount of the micro-atomized mixture of chemicals introduced to the interior of the balloon is controlled in order to prevent the chemical mixture from permeating through the entire balloon to the exterior surface. Accordingly, micro-atomized chemicals are used to effectively adhere to the inner balloon wall surface and to disperse the micro-atomized chemicals evenly throughout the inner balloon wall. Additionally, the chemicals can be introduced in a controlled manner in order to avoid the possibility of liquid puddles forming within the balloon, which can occur when using a pure liquid mixture of chemicals. The formation of liquid puddles will cause over-permeation of the chemicals at the sites where the puddles form, thereby creating "wet-spots" on the exterior of the balloon. Introduction of the mixture of chemicals as a vapor or gas can also help to minimizing the amount of manual labor necessary to scent the balloon.

FIG. 1 illustrates the interior chemical treatment system for an inflatable balloon, generally numbered 100, which includes a micro-atomizing device 102 having a nozzle 104, a feed tube 106, a ribbed balloon gripper 108, an air injector port 110, a micro-atomized mixture of chemicals 112, a latex balloon 114, and a neck for the latex balloon 116. This chemical treatment system 100 is not intended to limit the method of the invention to the physical components illustrated in FIG. 1. On the contrary, the method of the invention is intended to cover all alternatives, modifications and equivalents of the chemical treatment system 100 as may be included within the spirit and scope of the invention as defined by the appended claims.

In an embodiment of the method of the invention, the nozzle 104 of the micro-atomizing device 102 is inserted into a latex balloon 114. When inserting the nozzle 104, the neck of the balloon 116 is secured to the ribbed balloon gripper 108 and the nozzle 104 extends into the central portion of the initially flaccid balloon 114. Once the balloon 114 is secured to the ribbed balloon gripper 108, the air injector port 110 injects pressurized air into the balloon 114 to inflate the balloon 114. In an embodiment, the pressurized air can be injected into the balloon through the nozzle 104 of the micro-atomizing device 102, thereby eliminating the need for a separate air injector port 110. In an embodiment, the balloon 114 is partially inflated with just enough air to cause the balloon to stand stiff, but not enough air to stretch and expand the balloon 114. In another embodiment, the balloon 114 is partially inflated to fifty percent (50%) of its maximum capacity, the balloon's 114 maximum capacity corresponding to the specifications and/or guidelines set by the manufacturer for the balloon 114. The micro-atomized mixture of chemicals 112 is then injected into the balloon 114 from the micro-atomizing device 104 through the nozzle 104. In an embodiment, the micro-atomized mixture of chemicals 112 is injected as a pressured burst or a series of bursts from the micro-atomizing device 104.

The micro-atomized mixture of chemicals 112 is injected into the balloon 114 until the mixture 112 coats the entire inner surface of the balloon 114. The amount of mixture 112 injected into the balloon 114 depends primarily upon the size of the balloon, the thickness of the balloon 114 wall and the chemical purity of the particular balloon 114 being used. Once introduced into the balloon 114, the chemicals 112 adhere to and slowly begin to permeate into the balloon 114 wall. The amount of the micro-atomized chemical mixture 112 introduced to the interior of the balloon is controlled in order to prevent the chemical mixture 112 from permeating through the entire balloon to the exterior surface. The chemically treated balloon is then packaged in an airtight package with the chemical molecules being embedded and dormant within the latex membrane. Once inflated by the user, the porous latex surface expands and releases some of the embedded chemicals via evaporation, thereby scenting the surrounding area.

The micro-atomized mixture of chemicals 112 can include fragrances. These fragrances can include, but are not limited to, a mixture of essential oils, perfumes and/or other custom created proprietary chemicals. The micro-atomized mixture of chemicals may include a single chemical or a multiplicity of chemicals. In an embodiment, the mixture 112 may also include bitter safety additives, such as denatonium benzoate, to prevent children or household pets from chewing or ingesting the balloon or its pieces. In another embodiment, a thickening agent may be introduced to the chemicals 112, in order to increase the viscosity and adhesive properties of the mixture of chemicals 112 to the interior balloon cavity or wall. The amount and type of a particular thickening agent to be introduced to the chemical mixture 112 will vary depending on the exact chemical mixture 112 being used. In another embodiment, the mixture 112 may also include an additive that helps preserve the elasticity as well as the color of the balloon.

In an embodiment, a balloon that is approximately 1.5 times as thick as a standard balloon is used. This thicker balloon, for example, might have an uninflated thickness ranging from approximately 0.010 of an inch to 0.015 of an inch, with the neck being approximately 0.008 of an inch thick. The increased thickness of the balloon 114 has the dual purpose of decreasing the permeation rate of the chemicals 112 once put into its air-tight packaging and increasing the volume of the chemical 112 that can be released into the balloon. Thus, the balloon will, for example, retain its fragrant scent for a longer period of time as compared to a normal, thinner balloon with an average thickness of 0.004 of an inch uninflated. It is understood that a balloon having any thickness can be used with the method disclosed herein without deviating from the scope of the invention.

It is noted that temperature can also affect the permeation rate of the chemicals into the balloon. In general, the higher the temperature, the greater the rate of permeation. Accordingly, hot environmental temperatures should be avoided during the manufacture, storage and shipment of the balloons. It should also be noted that any shaped balloon can be used with the previously described interior chemical balloon treatment device; however, some mechanical changes and orientation adaptations may be needed as envisioned by one who is skilled in the art.

While embodiments and applications of this invention have been shown and described, it would be apparent to those skilled in the art having the benefit of this disclosure that many other modifications and extrapolations than mentioned above are possible without departing from the inventive concepts herein. The invention, therefore, is not to be restricted except in the spirit of the appended claims.

What is claimed is:

1. A method of chemically treating the interior cavity of an inflatable balloon so that the balloon emits a fragrance, comprising the steps of:
    (a) introducing a micro-atomized chemical mixture into the balloon, wherein the chemical mixture includes the fragrance;
    (b) allowing the micro-atomized chemical mixture to coat and permeate the inner surface of the balloon; and
    (c) allowing the fragrance to permeate to the exterior surface of the balloon and emit from the exterior surface of the balloon.

2. The method of claim 1 wherein the balloon is partially inflated with air before introducing the micro-atomized chemical mixture into the balloon.

3. The method of claim 1 wherein the balloon is partially inflated with just enough air to cause the balloon to stand stiff, but not enough air to stretch and expand the balloon before introducing the micro-atomized chemical mixture into the balloon.

4. The method of claim 1 wherein the micro-atomized chemical mixture is injected into the balloon using a micro-atomizing device.

5. The method of claim 1 wherein the micro-atomized chemical mixture includes a bitter safety additive to prevent people from licking, biting, chewing and choking on the balloon.

6. The method of claim 1 wherein the micro-atomized chemical mixture includes an additive which preserves color and pigmentation of the balloon.

7. The method of claim 1 wherein the micro-atomized chemical mixture includes an additive which enhances the elasticity of the inflatable balloon.

8. The method of claim 1 wherein the micro-atomized chemical mixture is allowed to permeate the inner surface of the balloon, but not allowed to fully permeate through the balloon to the outer surface.

9. The method of claim 1 wherein the micro-atomized chemical mixture evaporates into the surrounding environment when inflated.

10. The method of claim 1, further comprising injecting the micro-atomized chemical mixture into the balloon using a series of pressurized bursts.

11. The method of claim 1 wherein the micro-atomized chemical mixture includes liquids which have been changed completely into a gas.

12. The method of claim 1 wherein the balloon is uninflated before introducing the micro-atomized chemical mixture into the balloon.

13. A method of chemically treating the interior cavity of an inflatable balloon, comprising the steps of:
    (a) injecting a micro-atomized chemical mixture into the balloon using a micro-atomizing device, the micro-atomized chemical mixture including a fragrance, a bitter safety additive, a thickening agent, an additive that preserves color and pigmentation of the balloon and an additive that enhances the elasticity of the inflatable balloon;

(b) allowing the micro-atomized chemical mixture to coat and permeate the inner surface of the balloon, wherein the gaseous micro-atomized chemical mixture is allowed to permeate the inner surface of the balloon, but not allowed to fully permeate through the balloon to the outer surface; and (c) packaging the balloon such that the balloon resists permeation of the chemical mixture to the exterior surface of the balloon, wherein when the balloon is removed from the packaging and further inflated, at least the fragrance permeates to the exterior surface of the balloon and is emitted from the balloon.

14. The method of claim 13 wherein the balloon is partially inflated with air before injecting the micro-atomized chemical mixture into the balloon; and further comprising:

deflating the balloon prior to packaging the balloon.

15. The method of claim 13 wherein the balloon is uninflated before injecting the micro-atomized chemical mixture into the balloon.

16. A method of chemically treating the interior cavity of an inflatable balloon so that the balloon emits a fragrance when inflated, comprising the steps of:

(a) introducing a micro-atomized chemical mixture into the balloon, wherein the chemical mixture includes a fragrance;

(b) allowing the chemical mixture to coat and permeate the inner surface of the balloon; and (c) packaging the balloon to reduce permeation of the fragrance to the exterior surface of the balloon, wherein when the balloon is removed from the packaging and inflated, the fragrance permeates to the exterior surface of the balloon and is emitted from the balloon.

* * * * *